United States Patent
Luo et al.

(10) Patent No.: US 11,372,516 B2
(45) Date of Patent: Jun. 28, 2022

(54) METHOD, DEVICE, AND STORAGE MEDIUM FOR CONTROLLING DISPLAY OF FLOATING WINDOW

(71) Applicant: BEIJING XIAOMI MOBILE SOFTWARE CO., LTD., Beijing (CN)

(72) Inventors: Xi Luo, Beijing (CN); Bowen Li, Beijing (CN); Jianjiang Qu, Beijing (CN); Ming Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/206,004

(22) Filed: Mar. 18, 2021

(65) Prior Publication Data
US 2021/0333948 A1  Oct. 28, 2021

(30) Foreign Application Priority Data
Apr. 24, 2020 (CN) .......................... 202010335298.7

(51) Int. Cl.
*G06F 3/0481* (2022.01)
*G06F 3/04845* (2022.01)
*G06F 3/0488* (2022.01)

(52) U.S. Cl.
CPC .......... *G06F 3/0481* (2013.01); *G06F 3/0488* (2013.01); *G06F 3/04845* (2013.01); *G06F 2203/04806* (2013.01)

(58) Field of Classification Search
CPC .. G06F 3/0488; G06F 3/0481; G06F 3/04883; G06F 3/04845
See application file for complete search history.

(56) References Cited

U.S. PATENT DOCUMENTS

| | | | |
|---|---|---|---|
| 10,007,406 B1 * | 6/2018 | Libin | G06F 3/0484 |
| 10,551,995 B1 * | 2/2020 | Ho | G06F 3/0486 |
| 2011/0191712 A1 * | 8/2011 | Machida | G06F 3/0488 |
| | | | 715/788 |
| 2014/0033119 A1 | 1/2014 | Kim et al. | |
| 2014/0237367 A1 * | 8/2014 | Jung | G06F 3/04845 |
| | | | 715/728 |
| 2015/0007100 A1 * | 1/2015 | Wang | G06F 3/0484 |
| | | | 715/783 |
| 2015/0143285 A1 * | 5/2015 | Wei | G06F 3/04842 |
| | | | 715/799 |
| 2017/0372678 A1 | 12/2017 | Ying | |

(Continued)

FOREIGN PATENT DOCUMENTS

CN    103488418 A    1/2014

OTHER PUBLICATIONS

Chinese Patent Application No. 202010335298.7 First Office Action dated Mar. 30, 2021, 6 pages.

(Continued)

*Primary Examiner* — Mong-Shune Chung
(74) *Attorney, Agent, or Firm* — Lathrop GPM LLP

(57) ABSTRACT

A method, device and storage medium for controlling display of floating window. The method may include the following. A touch signal in a display area of the floating window may be received. A sub-area located by an initial touch position of the touch signal may be determined. The display of the floating window may be controlled based on a touch function type corresponding to the sub-area and a movement track of the touch signal.

19 Claims, 7 Drawing Sheets

(56) References Cited

U.S. PATENT DOCUMENTS

2018/0150208 A1\* 5/2018 Song ..................... G06F 3/0481
2020/0045375 A1   2/2020 Augustus, III et al.
2020/0326839 A1\* 10/2020 Walkin ................. G06F 3/0486

OTHER PUBLICATIONS

Chinese Patent Application No. 202010335298.7 English translation of First Office Action dated Mar. 30, 2021, 6 pages.
European Patent Application No. 21165905.7 Search Report and Opinion, dated Sep. 28, 2021, 7 pages.

\* cited by examiner

METHOD, DEVICE, AND STORAGE MEDIUM FOR CONTROLLING DISPLAY OF FLOATING WINDOW

CROSS-REFERENCE TO RELATED APPLICATION

This application claims the benefit of priority to Chinese Patent Application No. 202010335298.7, filed on Apr. 24, 2020, the contents of which are incorporated herein by reference in their entirety.

TECHNICAL FIELD

This disclosure generally relates to data processing technologies of mobile terminals, and, more particularly, to a method for controlling display of a floating window, a device for controlling display of a floating window, and a storage medium.

BACKGROUND

Applications may be displayed as floating windows (also known as small windows) to enable users to view information about these applications.

SUMMARY

According to a first aspect of embodiments of the disclosure, there is provided a method for controlling display of a floating window, including: receiving a touch signal in a display area of the floating window; determining a sub-area located by an initial touch position of the touch signal; and controlling display of the floating window based on a touch function type corresponding to the sub-area and a movement track of the touch signal.

According to a second aspect of embodiments of the disclosure, there is provided a device for controlling display of a floating window, including: a processor; and a memory for storing instructions executable by the processor. The processor is configured to execute the instructions in the memory to perform the method in any one of the above embodiments.

According to a third aspect of embodiments of the disclosure, there is provided a non-transitory computer-readable storage medium having stored therein instructions that, when executed by a processor, causes the processor to perform the method in any one of the above embodiments.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

Applications may be displayed as floating windows (also known as small windows) to enable users to view information about these applications. To control these windows, an operation bar may be generally added outside the corresponding window, and function buttons such as closing, full-screen, and drag may be set in the operation bar. However, the fill color of the operation bar may not completely match the overall color of the window, resulting in poor color matching between the operation bar and the window, and affecting the video experience. Furthermore, the function buttons are small, which may make click operations inconvenient. In addition, the function buttons may be set in the same area, which may be prone to accidental click operations.

Figure 1:
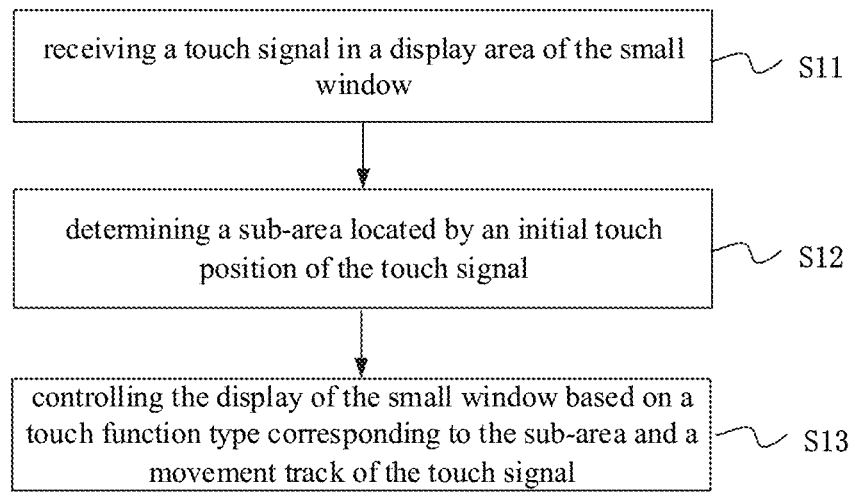
FIG. 1 is a flow chart of a method for controlling display of a floating window, according to some embodiments of the disclosure.

Embodiments of the disclosure may provide a method for controlling display of a floating window. Referring to FIG. 1, FIG. 1 is a flow chart of a method for controlling display of a floating window, according to some embodiments of the disclosure. As illustrated in FIG. 1, the method may include the following.

At block S11, a touch signal in a display area of the floating window is received.

At block S12, a sub-area located by an initial touch position of the touch signal is determined.

At block S13, the display of the floating window is controlled based on a touch function type corresponding to the sub-area and a movement track of the touch signal.

In some embodiments, a plurality of sub-areas of different touch function types may be set in the display area of the floating window. Different touch operations inputted by the user may be received in different sub-areas. Different corresponding touch controls may be performed on the floating window. Therefore, the overall interface beauty of the floating window may be kept, and it is easy for the user to operate.

Embodiments of the disclosure may further provide a method for controlling display of a floating window. This method may realize a function of dragging the floating window. This method may include the actions illustrated in FIG. 1. Controlling the display of the floating window based on the touch function type corresponding to the sub-area and the movement track of the touch signal at block S13 may include: when the touch function type corresponding to the sub-area is a drag operation type, acquiring a display interface of the floating window, calculating a direction vector of a current touch position and the initial touch position based on the movement track of the touch signal in real time, determining an update display area of the floating window based on the direction vector, and displaying the display interface in the update display area. A size of the update display area is the same as a size of an original display area of the floating window.

In some embodiments, the floating window may include three areas. The first area is located in top of the floating window and configured to display a title item. The second area is located in bottom of the floating window and configured to display inputting tools. The third area is located in middle of the floating window and configured to display interactive content.

In some embodiments, a sub-area where the touch function type is a drag operation type is located in middle of the first area. To make the user know the location of this sub-area, a first identifier is displayed on the display interface of the floating window. This first identifier is located on the sub-area where the touch function type is the drag operation type. This first identifier is configured to prompt the user to perform a drag operation. The graph of the first identifier is a crossbar, a logo including a four-direction arrow, a hand logo, or a custom-shaped logo for dragging.

Figure 2:
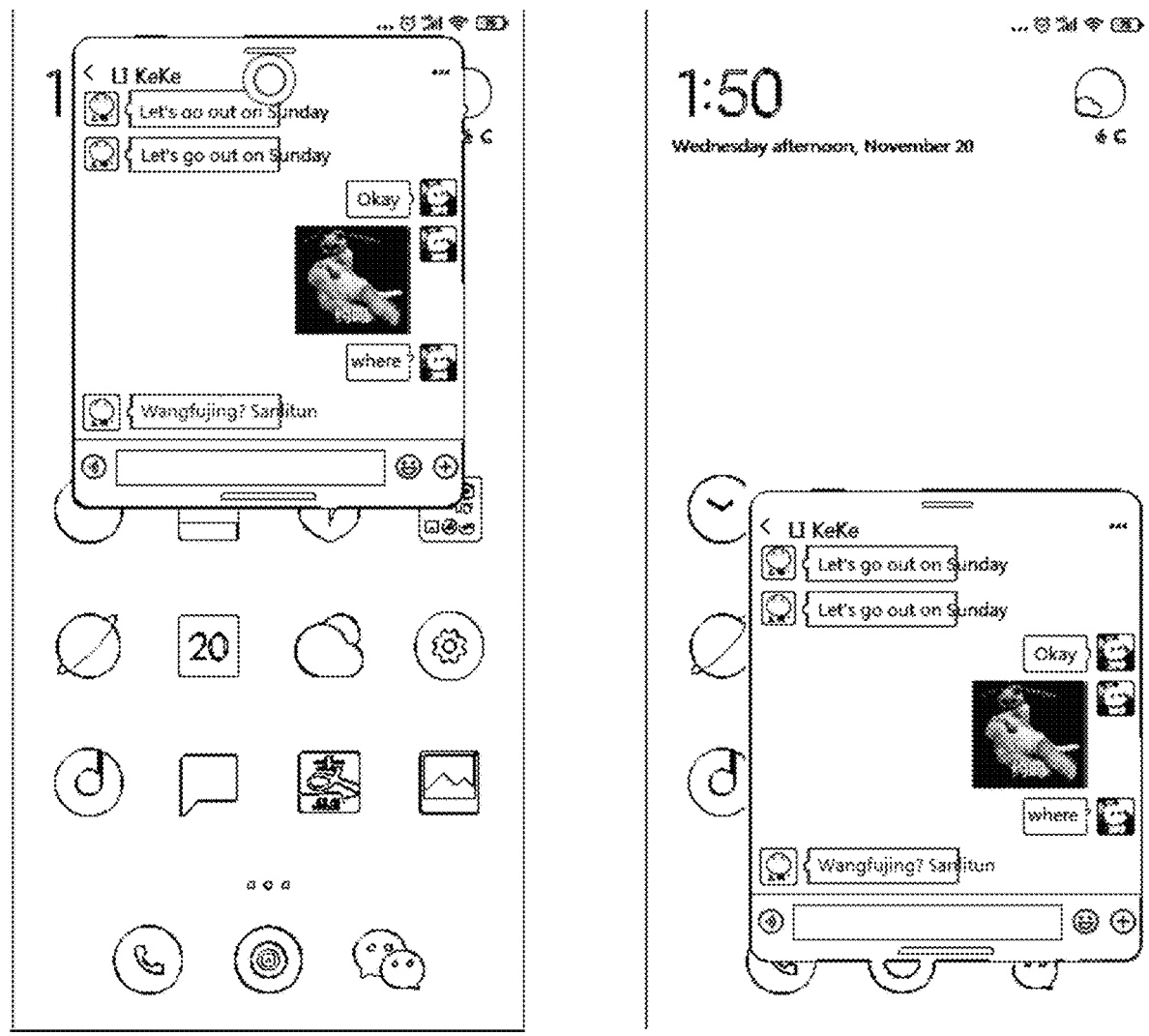
FIG. 2 is a schematic diagram illustrating an effect of dragging a floating window, according to some embodiments of the disclosure.

For example, as illustrated in FIG. 2, the user clicks the crossbar in top of the floating window and performs a downward sliding touch to move the floating window from the upper part of the screen to the lower part of the screen. In order to provide a good interactive and response effect, after receiving a click operation on the crossbar in top of the floating window, a circular icon is displayed at the corresponding initial touch position to indicate that the click operation is received.

In some embodiments, the floating window may not exceed the display area of the touch screen when the floating window moves with the touch signal. When the touch signal ends, that is, when the user's finger leaves the touch screen, the current update display area of the floating window is recorded.

In some embodiments, in order to prevent the floating window from exceeding the display area of the touch screen, the method further includes: when the update display area of the floating window determined based on the direction vector exceeds a side edge of a display area of a touch screen, determining that the update display area is located in the display area of the touch screen, and that a distance between a corresponding same side edge of the update display area and the side edge of the display area of the touch screen is less than or equal to a preset distance, or after controlling the floating window to perform animation effect display, determining that the update display area is located in the display area of the touch screen, and that a distance between a corresponding same side edge of the update display area and the side edge of the display area of the touch screen is less than or equal to a preset distance.

During the rendering processing of the interface display effect, when it is detected that the received touch signal includes a sliding touch event (corresponding to a moment when the user starts a sliding touch after tapping the touch screen), an animation layer (such as a leash layer) is created for the interface rendering structure of the floating window, preparing for the subsequent interface rendering. During the duration of the sliding touch event (corresponding to the process of user's sliding touch), the animation layer is rendered by displacement to show the interface display effect when the floating window moves with the touch signal.

The update display area of the floating window determined based on the direction vector exceeds the side edge of the display area of the touch screen, for example, the determined update display area of the floating window exceeds the side edge of the display area of the touch screen when the user's finger leaves the touch screen. In this case, it needs the floating window to be kept within the display area of the touch screen. By calling an animation class (such as class SpringAnimation) in the above animation layer, it shows the animation display effect that the floating window returns to the display area of the touch screen in the display area of the touch screen, and the update display area corresponding to the latest position of the floating window may be saved.

Embodiments of the disclosure may further provide a method for controlling display of a floating window. This method may realize a function of closing the floating window. This method may include the actions illustrated in FIG. 1. Controlling the display of the floating window based on the touch function type corresponding to the sub-area and the movement track of the touch signal at block S13 may include: when the touch function type corresponding to the sub-area is a closing operation type, determining a movement direction of the touch signal, and when the movement direction is a first direction, closing the floating window, or after a first rendering processing is performed on the floating window, closing the floating window.

In some embodiments, a sub-area where the touch function type is a closing operation type is located in middle of the second area. To make the user know the location of this sub-area, a second identifier is displayed on the display interface of the floating window. This second identifier is located on the sub-area where the touch function type is the closing operation type. This second identifier is configured to prompt the user to perform a closing operation. The graph of the second identifier is a crossbar, cross, a circle, or a custom-shaped logo for closing.

The first direction is a set direction based on the positive placement of the touch screen, for example, the set direction is a direction from bottom to top.

The first rendering processing may include at least one of: decreasing a size of the floating window, increasing a transparency of the floating window, decreasing a contrast of the floating window, and increasing a lightness of the floating window.

In some embodiments, controlling the display of the floating window based on the touch function type corresponding to the sub-area and the movement track of the touch signal at block S13 may include: when the touch function type corresponding to the sub-area is a closing operation type, determining a movement direction of the touch signal, when the movement direction is a first direction, performing and recording a first rendering processing on the floating window during a maintaining process of the touch signal, and detecting a sliding length of the touch signal, closing the floating window when the sliding length is greater than or equal to a preset length, and performing the first rendering processing in reverse when the touch signal ends and the sliding length is less than the preset length, such that the floating window restores the display before receiving the touch signal.

During the rendering processing of the interface display effect, when it is detected that the received touch signal includes a sliding touch event (corresponding to a moment when the user starts a sliding touch after tapping the touch screen), an animation layer (such as a leash layer) is created for the interface rendering structure of the floating window, preparing for the subsequent interface rendering. When the first rendering processing is performed, by calling an animation class (such as class SpringAnimation) in the above animation layer, the animation layer is rendered corresponding to the effect, so that the floating window displays the interface display effect corresponding to the first rendering processing until it disappears completely, and then close the floating window. When it needs to perform the reverse first rendering processing, by calling an animation class (such as class SpringAnimation) in the above animation layer, the animation layer is rendered corresponding to the effect, so that the floating window displays the animation display effect corresponding to the reverse first rendering processing, showing the restoration animation effect of the first rendering processing.

Embodiments of the disclosure may further provide a method for controlling display of a floating window. This method may realize a function of full-screen. This method may include the actions illustrated in FIG. 1. Controlling the display of the floating window based on the touch function type corresponding to the sub-area and the movement track of the touch signal at block S13 may include: when the touch function type corresponding to the sub-area is a full-screen operation type, determining a movement direction of the touch signal, when the movement direction is a second direction, displaying content of the floating window in a full-screen mode, or after performing a second rendering processing on the floating window, displaying content of the floating window in a full-screen mode.

The second direction is a set direction based on the positive placement of the touch screen, for example, the set direction is a direction from top to bottom.

The second rendering processing includes increasing a size of the floating window based on a screen ratio of a touch screen.

In some embodiments, controlling the display of the floating window based on the touch function type corresponding to the sub-area and the movement track of the touch signal at block S13 may include: when the touch function type corresponding to the sub-area is a full-screen operation type, determining a movement direction of the touch signal, when the movement direction is a second direction, performing and recording a second rendering processing on the floating window during a maintaining process of the touch signal, and detecting a sliding length of the touch signal, displaying content of the floating window in a full-screen mode when the sliding length is greater than or equal to a preset length, and performing the second rendering processing in reverse when the touch signal ends and the sliding length is less than the preset length, such that the floating window restores the display before receiving the touch signal.

During the rendering processing of the interface display effect, when it is detected that the received touch signal includes a sliding touch event (corresponding to a moment when the user starts a sliding touch after tapping the touch screen), an animation layer (such as a leash layer) is created for the interface rendering structure of the floating window, preparing for the subsequent interface rendering. When the second rendering processing is required, by calling an animation class (such as class SpringAnimation) in the above animation layer, the animation layer is rendered corresponding to the effect, so that the floating window displays the interface display effect corresponding to the second rendering processing until it disappears completely, and then close the floating window. When it needs to perform the reverse second rendering processing, by calling an animation class (such as class SpringAnimation) in the above animation layer, the animation layer is rendered corresponding to the effect, so that the floating window displays the animation display effect corresponding to the reverse second rendering processing, showing the restoration animation effect of the second rendering processing.

In some embodiments, a sub-area where the touch function type is a full-screen operation type, is located in middle of a second area of the floating window. To make the user know the location of this sub-area, a third identifier is displayed on the display interface of the floating window. This third identifier is located on the sub-area where the touch function type is the full-screen operation type. This third identifier is configured to prompt the user to perform a full-screen operation. The graph of the third identifier is a crossbar, a rectangle including a diagonally outward arrow, or a custom-shaped logo for representing the full-screen operation.

A sub-area where the touch function type is a closing operation type and a sub-area where the touch function type is a full-screen operation type may be separate areas. They may be arranged side by side in middle of the second area. Alternatively, a sub-area where the touch function type is a closing operation type and a sub-area where the touch function type is a full-screen operation type may be a common area, as illustrated in FIGS. 3 and 4.

Figure 3:
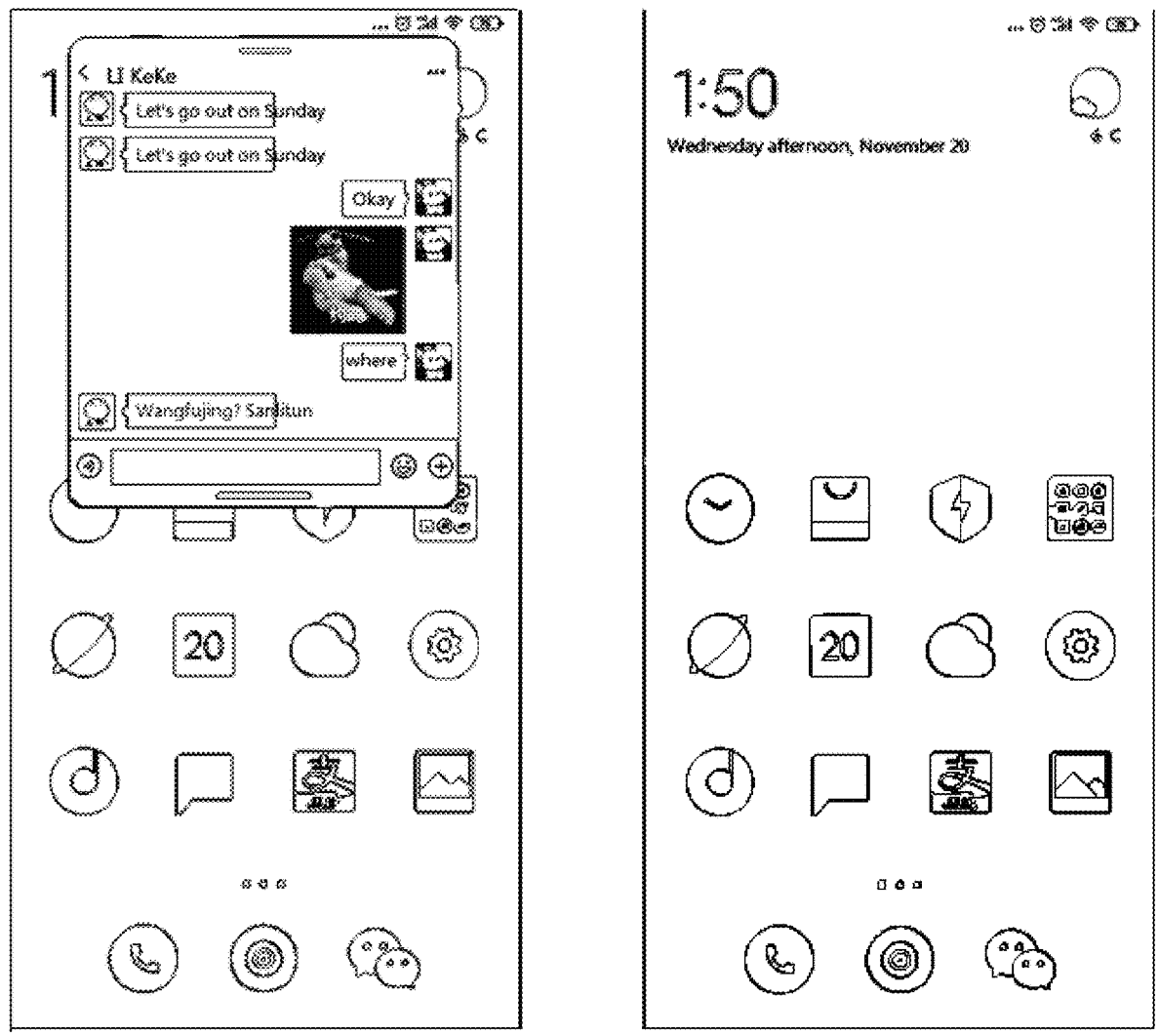
FIG. 3 is a schematic diagram illustrating an effect of closing a floating window, according to some embodiments of the disclosure.

As illustrated in FIG. 3, when the user clicks on the crossbar in bottom of the floating window and performs a downward sliding touch to close the floating window, the floating window is closed. In order to provide a good interactive and response effect, after receiving a click operation on the crossbar in bottom of the floating window, a circular icon is displayed at the corresponding initial touch position to indicate that the click operation is received.

Figure 4:
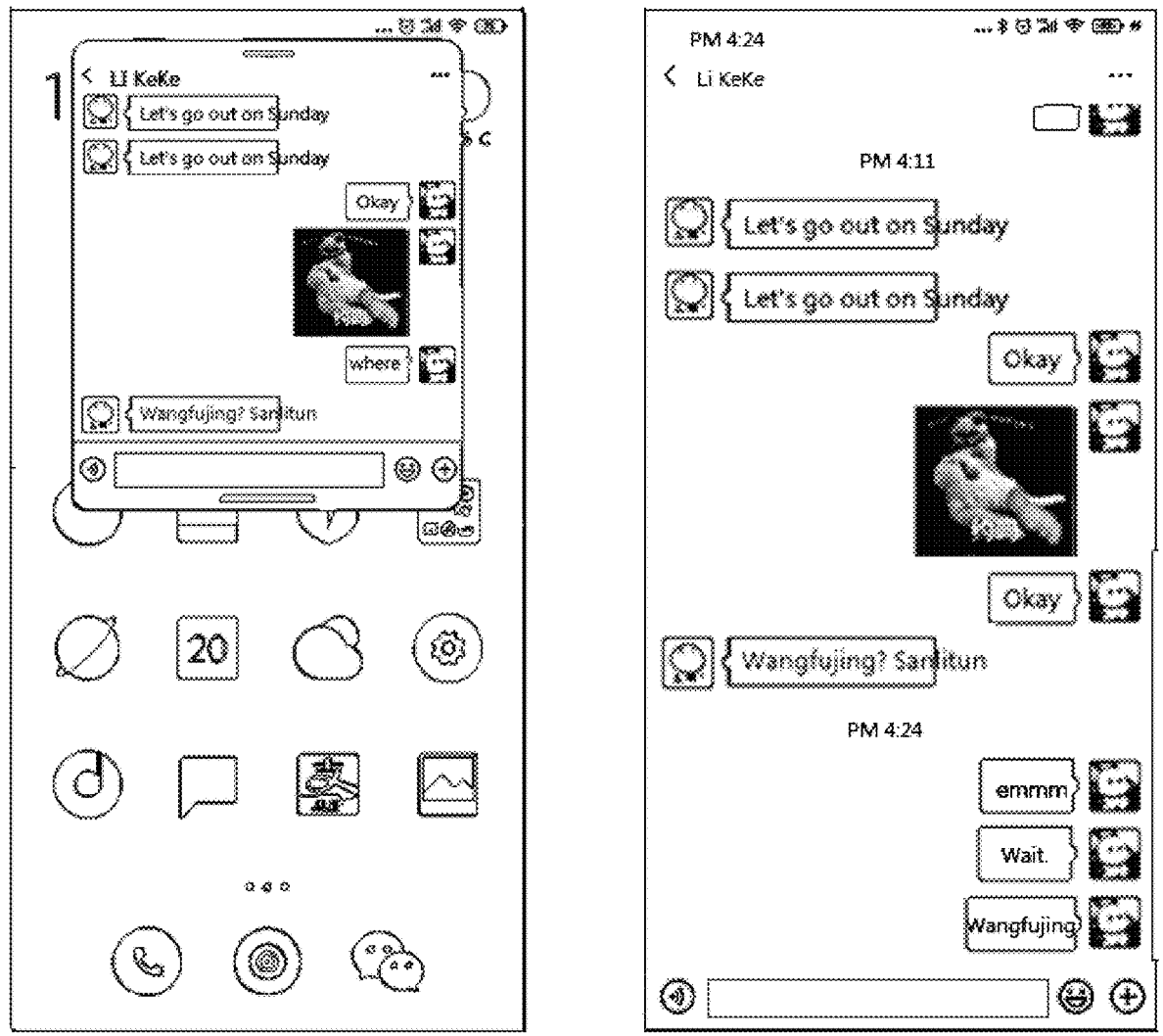
FIG. 4 is a schematic diagram illustrating an effect of performing full-screen on a floating window, according to some embodiments of the disclosure.

As illustrated in FIG. 4, when the user clicks on the crossbar in bottom of the floating window and performs a downward sliding touch to close the floating window, the floating window is made as a full-screen display.

Embodiments of the disclosure may further provide a method for controlling display of a floating window. This method may realize a function of zooming the floating window. This method may include the actions illustrated in FIG. 1. Controlling the display of the floating window based on the touch function type corresponding to the sub-area and the movement track of the touch signal at block S13 may include: when the touch function type corresponding to the sub-area is a zoom operation type, acquiring a display interface of the floating window, calculating a direction vector of a current touch position and the initial touch position based on the movement track of the touch signal in real time, determining an update size of the floating window based on the direction vector, determining an update display area based on the update size while keeping a reference point of the floating window unchanged, and displaying the display interface in the update display area.

In some embodiments, when the touch signal ends, the current update display area of the floating window is recorded, and this update display area is regarded as the latest display area of the floating window.

In some embodiments, the maximum size and the minimum size of the floating window are set. In the process of responding to the touch signal, when the update display area is determined based on the update size, the update display area is maintained and remains unchanged under a case that the update display area is smaller than the minimum size so that the floating window is fixed at the minimum size; and the update display area is maintained and remains unchanged under a case that the update display area is larger than the maximum size, so that the floating window is fixed at the maximum size.

In some embodiments, determining the update size of the floating window based on the direction vector includes: determining the update size of the floating window based on an aspect ratio of the floating window and the direction vector. The detail may be as follows.

When the angle between the direction vector and the corresponding diagonal line of the floating window is 0, the aspect ratio corresponding to the update size of the floating window is the same as the aspect ratio when the floating window is not zoomed. For example, when the touch signal for zooming is sliding along the lower right corner of the floating window toward the inside or outside of the floating window, the corresponding diagonal line of the floating window is the diagonal line between the upper left corner and the lower right corner. When the touch signal for zooming is sliding along the lower left corner of the floating window toward the inside or outside of the floating window, the corresponding diagonal line of the floating window is the diagonal line between the upper right corner and the lower left corner.

When the angle between the direction vector and the corresponding diagonal line of the floating window is greater than 0, the direction vector faces the inside of the floating window, and when the direction vector is within the angle range between the corresponding diagonal line and the corresponding long side, the aspect ratio corresponding to the update size of the floating window is smaller than the aspect ratio when the floating window is not zoomed, and gradually becomes smaller as the length of the direction vector increases. When the direction vector is within the angle range between the corresponding diagonal line and the corresponding short side, the aspect ratio corresponding to the update size of the floating window is greater than the aspect ratio when the floating window is not zoomed, and gradually becomes greater as the length of the direction vector increases.

When the angle between the direction vector and the corresponding diagonal line of the floating window is greater than 0, the direction vector faces the outside of the floating window, and when the direction vector is within the angle range between the extension of the corresponding diagonal line and the extension of the corresponding long side, the aspect ratio corresponding to the update size of the floating window is greater than the aspect ratio when the floating window is not zoomed, and gradually becomes greater as the length of the direction vector increases. When direction vector is within the angle range between the extension of the corresponding diagonal line and the extension of the corresponding short side, the aspect ratio corresponding to the update size of the floating window is smaller than the aspect ratio when the floating window is not zoomed, and gradually becomes smaller as the length of the direction vector increases.

The reference point is a vertex of a position in the floating window opposite to a vertex corresponding to the touch signal in the floating window, or a center point of the floating window. For example: when the vertex corresponding to the touch signal is the lower right vertex of the floating window, the reference point is the upper left vertex of the floating window. When the vertex corresponding to the touch signal is the lower left vertex of the floating window, the reference point is the upper right vertex of the floating window.

A sub-area where the touch function type is a zoom operation type is located in top of the second area of the floating window, in which the second area is located in bottom of the floating window and configured to display inputting tools.

Figure 5:
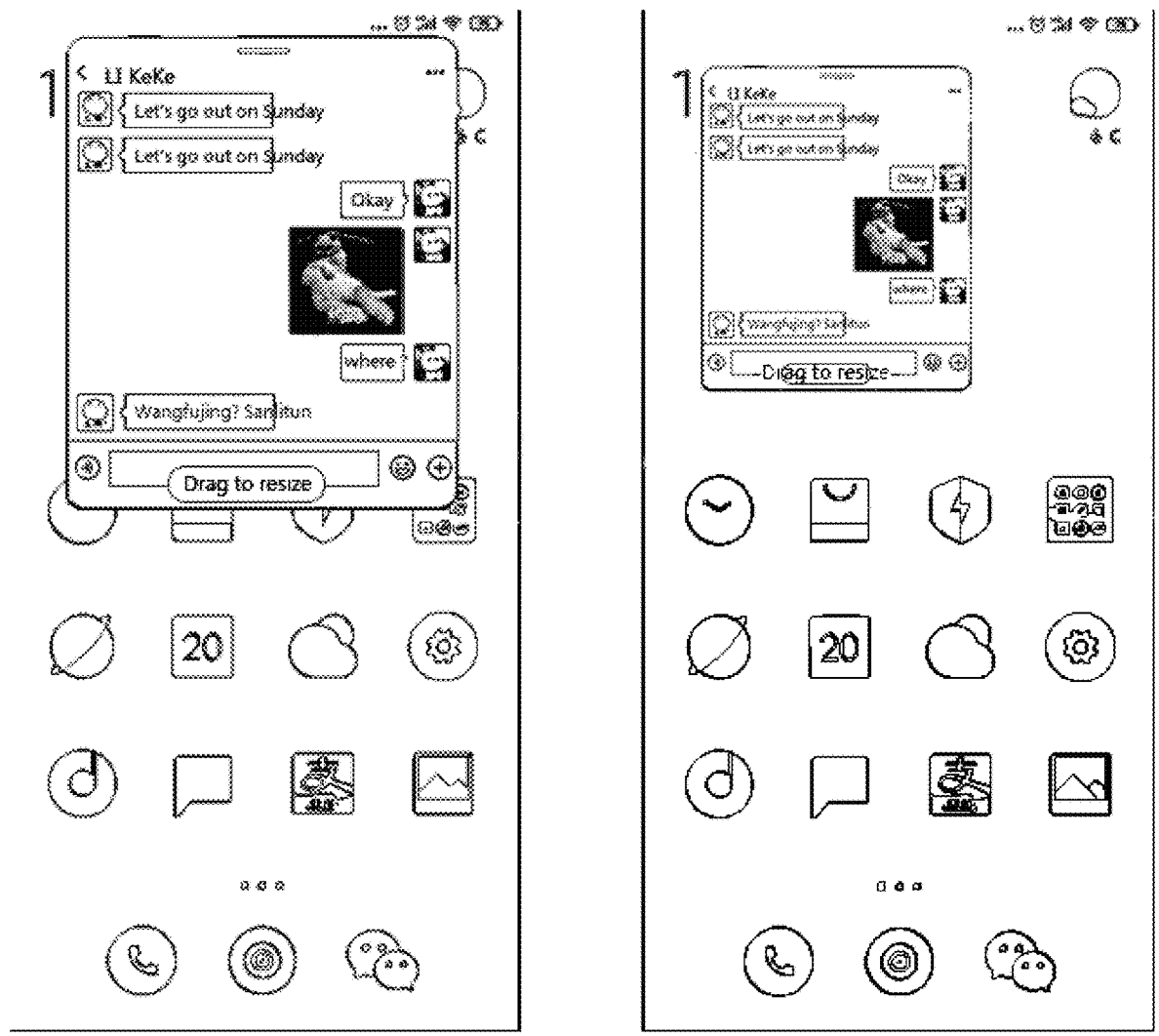
FIG. 5 is a schematic diagram illustrating an effect of zooming a floating window, according to some embodiments of the disclosure.

As illustrated in FIG. 5, when the user clicks on the end in bottom of the floating window and performs a sliding touch in the upper left oblique direction to shrink the floating window. In order to enhance the visual effect of zooming, the method may further include: performing a third rendering processing on a frame of the floating window while displaying the display interface in the update display area, the third rendering processing including at least one of: colorization, bold, superimposing a zoom logo.

During the rendering processing of the interface display effect, after the zoom operation type is determined, a border rendering effect is added to the overall view of the interface of the floating window (such as decorationcaptionView), for example, a border prompt effect of the floating window is added through the foreground. The duration of the border rendering effect is a set duration, for example, 2 seconds.

In some embodiments, the update size and the update display area of the floating window may be determined based on the direction vector. When the display interface is displayed in the update display area, the size of the update display area is determined. When the size is greater than the first preset size and the touch signal ends, or the size is smaller than the second preset size and the touch signal ends, the floating window is controlled to perform animation effect display and to restore the display before the touch signal is received. The first preset size is greater than the second preset size.

During the rendering processing of the interface display effect, when it is detected that the received touch signal includes a sliding touch event (corresponding to a moment when the user starts a sliding touch after tapping the touch screen), an animation layer (such as a leash layer) is created for the interface rendering structure of the floating window, preparing for the subsequent interface rendering. When the floating window reaches the minimum size during the zooning in process and when the floating window reaches the maximum size during the zooming out process, by calling an animation class (such as class SpringAnimation) in the above animation layer, the damping animation effect is displayed; when the touch signal ends, by calling an animation class (such as class SpringAnimation) in the above animation layer, the rebound animation effect is displayed.

Figure 6:
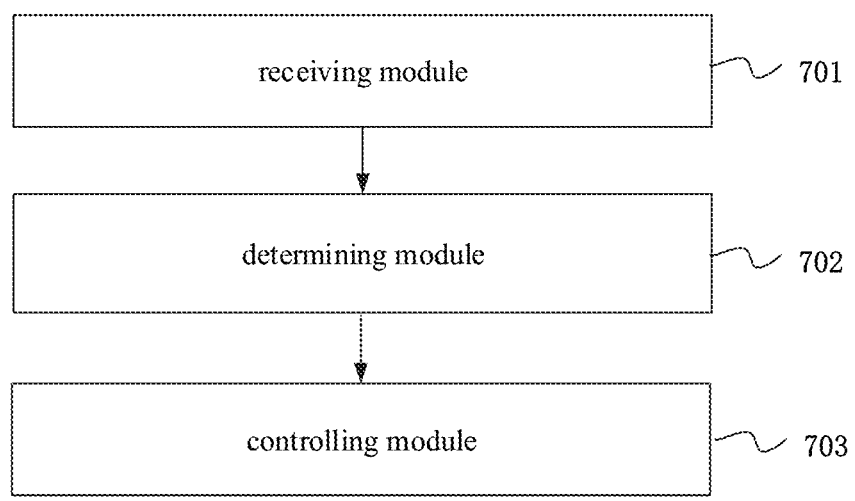
FIG. 6 is a block diagram of an apparatus for controlling display of a floating window, according to some embodiments of the disclosure.

Embodiments of the disclosure may provide an apparatus for controlling display of a floating window. Referring to FIG. 6, FIG. 6 is a block diagram of an apparatus for controlling display of a floating window, according to some embodiments of the disclosure. As illustrated in FIG. 6, the apparatus includes a receiving module 701, a determining module 702, and a controlling module 703.

The receiving module 701 is configured to receive a touch signal in a display area of the floating window.

The determining module 702 is configured to determine a sub-area located by an initial touch position of the touch signal.

The controlling module 703 is configured to control the display of the floating window based on a touch function type corresponding to the sub-area and a movement track of the touch signal.

Embodiments of the disclosure may provide an apparatus for controlling display of a floating window. The apparatus includes modules in FIG. 6. The controlling module 703 includes a drag processing module. The drag processing module is configured to: when the touch function type corresponding to the sub-area is a drag operation type, acquire a display interface of the floating window, calculate a direction vector of a current touch position and the initial touch position based on the movement track of the touch signal in real time, determine an update display area of the floating window based on the direction vector, and display the display interface in the update display area.

A size of the update display area is the same as a size of an original display area of the floating window.

In some embodiments, the drag processing module is further configured to: when the update display area of the floating window determined based on the direction vector exceeds a side edge of a display area of a touch screen, determine that the update display area is located in the display area of the touch screen, and that a distance between a corresponding same side edge of the update display area and the side edge of the display area of the touch screen is less than or equal to a preset distance, or after controlling the floating window to perform animation effect display, determine that the update display area is located in the display area of the touch screen, and that a distance between a corresponding same side edge of the update display area and the side edge of the display area of the touch screen is less than or equal to a preset distance.

In some embodiments, the drag processing module is further configured to: display a first identifier on the display interface of the floating window, the first identifier being located on the sub-area where the touch function type is the drag operation type, and the first identifier being configured to prompt a user to perform a drag operation.

Embodiments of the disclosure may provide an apparatus for controlling display of a floating window. The apparatus includes modules in FIG. 6. The controlling module 703 includes a closing processing module. The closing processing module is configured to: when the touch function type corresponding to the sub-area is a closing operation type, determine a movement direction of the touch signal, and when the movement direction is a first direction, close the floating window, or after a first rendering processing is performed on the floating window, close the floating window.

In some embodiments, The closing processing module is configured to: when the touch function type corresponding to the sub-area is a closing operation type, determine a movement direction of the touch signal, when the movement direction is a first direction, perform and record a first rendering processing on the floating window during a maintaining process of the touch signal, and detect a sliding length of the touch signal, close the floating window when the sliding length is greater than or equal to a preset length, and perform the first rendering processing in reverse when the touch signal ends and the sliding length is less than the preset length.

In some embodiments, the first rendering processing includes at least one of: decreasing a size of the floating window, increasing a transparency of the floating window, decreasing a contrast of the floating window, and increasing a lightness of the floating window.

Embodiments of the disclosure may provide an apparatus for controlling display of a floating window. The apparatus includes modules in FIG. 6. The controlling module 703 includes a full-screen processing module. The full-screen processing module is configured to: when the touch function type corresponding to the sub-area is a full-screen operation type, determine a movement direction of the touch signal, when the movement direction is a second direction, perform a second rendering processing on the floating window and display content of the floating window in a full-screen mode, or after performing a second rendering processing on the floating window, display content of the floating window in a full-screen mode.

In some embodiments, the second rendering processing includes increasing a size of the floating window based on a screen ratio of a touch screen.

Embodiments of the disclosure may provide an apparatus for controlling display of a floating window. The apparatus includes modules in FIG. 6. The controlling module 703 includes a zoom processing module. The zoom processing module is further configured to: when the touch function type corresponding to the sub-area is a zoom operation type, acquire a display interface of the floating window, calculate a direction vector of a current touch position and the initial touch position based on the movement track of the touch signal in real time, determine an update size of the floating window based on the direction vector, determine an update display area based on the update size while keeping a reference point of the floating window unchanged, and display the display interface in the update display area.

The reference point is a vertex of a position in the floating window opposite to a vertex corresponding to the touch signal in the floating window, or a center point of the floating window.

In some embodiments, the zoom processing module is further configured to: perform a third rendering processing on a frame of the floating window while displaying the display interface in the update display area, the third rendering processing comprising at least one of: colorization, bold, superimposing a zoom logo.

In some embodiments, a sub-area where the touch function type is a drag operation type, is located in a first area of the floating window, in which the first area is located in top of the floating window and configured to display a title item, and a sub-area where the touch function type is a closing operation type and a sub-area where the touch function type is a full-screen operation type, are located in middle of a second area of the floating window, and a sub-area where the touch function type is a zoom operation type is located in top of the second area of the floating window, in which the second area is located in bottom of the floating window and configured to display inputting tools.

Embodiments of the disclosure may provide a device for controlling display of a floating window, including: a processor; and a memory for storing instructions executable by the processor. The processor is configured to execute the instructions in the memory to perform the method in any one of the above embodiments.

Embodiments of the disclosure may provide anon-transitory computer-readable storage medium. The storage medium may have stored instructions. When the instructions are executed by a processor, the processor may be caused to perform the method in any one of the above embodiments.

Figure 7:
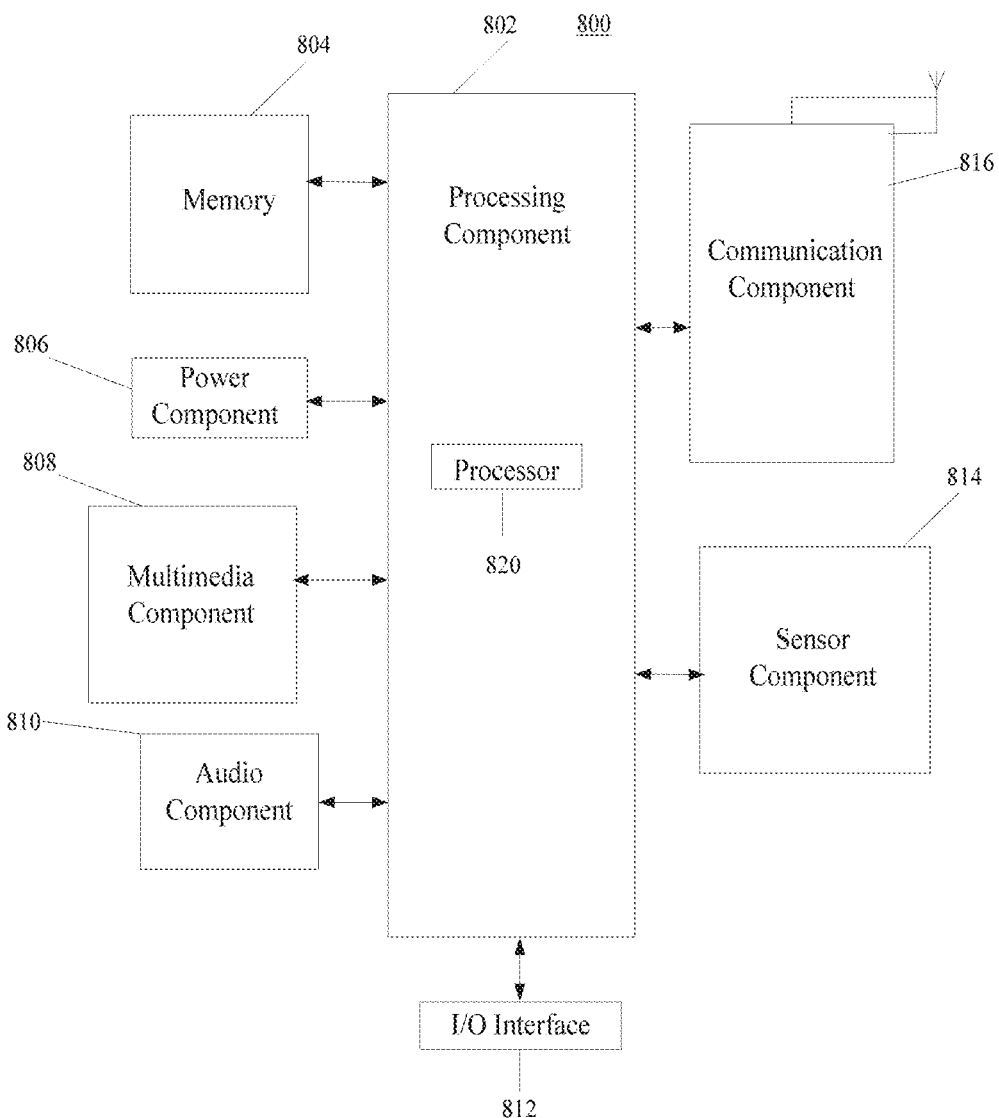
FIG. 7 is a block diagram of a device for controlling display of a floating window, according to some embodiments of the disclosure.

FIG. 7 is a block diagram of a device for controlling display of a floating window. For example, the device 800 may be a mobile phone, a computer, a digital broadcast terminal, a messaging device, a gaming console, a tablet, a medical device, exercise equipment, a personal digital assistant, and the like.

Referring to FIG. 7, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination of any type of volatile and non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

Other embodiments of the invention will be apparent to those skilled in the art from consideration of the specification and practice of the invention disclosed here. This disclosure is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling display of a floating window, comprising:
   receiving a touch signal in a display area of the floating window;
   determining a sub-area located by an initial touch position of the touch signal; and
   controlling the display of the floating window based on a touch function type corresponding to the sub-area and a movement track of the touch signal,
   wherein there are a plurality of sub-areas in the display area of the floating window and a plurality of touch function types for the floating window, and different touch function types are corresponding to different sub-areas;
   wherein the sub-area where the touch function type is a drag operation type is located in a first area of the floating window, in which the first area is located in top of the floating window and configured to display a title item, and
   the sub-area where the touch function type is a closing operation type and the sub-area where the touch function type is a full-screen operation type, are located in middle of a second area of the floating window, and the sub-area where the touch function type is a zoom operation type is located in top of the second area of the floating window, in which the second area is located in bottom of the floating window and configured to display inputting tools.

2. The method of claim 1, wherein controlling the display comprises:
   when the touch function type corresponding to the sub-area is a drag operation type, acquiring a display interface of the floating window,
   calculating a direction vector of a current touch position and the initial touch position based on the movement track of the touch signal in real time,
   determining an update display area of the floating window based on the direction vector, and
   displaying the display interface in the update display area,
   wherein, a size of the update display area is the same as a size of an original display area of the floating window.

3. The method of claim 2, further comprising:
   when the update display area of the floating window determined based on the direction vector exceeds a side edge of a display area of a touch screen, determining the update display area being located in the display area of the touch screen, and a distance between a corresponding same side edge of the update display area and the side edge of the display area of the touch screen being less than or equal to a preset distance.

4. The method of claim 2, further comprising:
   after controlling the floating window to perform animation effect display, determining the update display area being located in the display area of the touch screen, and a distance between a corresponding same side edge of the update display area and the side edge of the display area of the touch screen being less than or equal to a preset distance.

5. The method of claim 2, further comprising:
   displaying a first identifier on the display interface of the floating window, the first identifier being located on the sub-area where the touch function type is the drag operation type, and the first identifier being configured to prompt a user to perform a drag operation.

6. The method of claim 1, wherein controlling the display comprises:
   when the touch function type corresponding to the sub-area is a closing operation type, determining a movement direction of the touch signal, and
   when the movement direction is a first direction, performing at least one of (a) closing the floating window, and (b) closing the floating window after a first rendering processing is performed on the floating window.

7. The method of claim 1, wherein controlling the display comprises:
   when the touch function type corresponding to the sub-area is a closing operation type, determining a movement direction of the touch signal,
   when the movement direction is a first direction, performing and recording a first rendering processing on the floating window during a maintaining process of the touch signal, and detecting a sliding length of the touch signal,
   closing the floating window when the sliding length is greater than or equal to a preset length, and
   performing the first rendering processing in reverse when the touch signal ends and the sliding length is less than the preset length.

8. The method of claim 1, wherein controlling the display comprises:
   when the touch function type corresponding to the sub-area is a full-screen operation type, determining a movement direction of the touch signal,
   when the movement direction is a second direction, performing at least one of performing a second rendering processing on the floating window and displaying content of the floating window in a full-screen mode, and displaying content of the floating window in a full-screen mode after performing a second rendering processing on the floating window.

9. The method of claim 1, wherein controlling the display comprises:
   when the touch function type corresponding to the sub-area is a zoom operation type, acquiring a display interface of the floating window,
   calculating a direction vector of a current touch position and the initial touch position based on the movement track of the touch signal in real time,
   determining an update size of the floating window based on the direction vector,
   determining an update display area based on the update size while keeping a reference point of the floating window unchanged, and
   displaying the display interface in the update display area,
   wherein the reference point is at least one of (a) a vertex of a position in the floating window opposite to a vertex corresponding to the touch signal in the floating window, and (b) a center point of the floating window.

10. The method of claim 9, further comprising:
    performing a third rendering processing on a frame of the floating window while displaying the display interface in the update display area, the third rendering processing comprising at least one of: colorization, bold, superimposing a zoom logo.

11. A device for controlling display of a floating window, comprising:
    a processor; and
    a memory for storing instructions executable by the processor;

wherein the processor is configured to execute the instructions to:
receive a touch signal in a display area of the floating window;
determine a sub-area located by an initial touch position of the touch signal; and
control the display of the floating window based on a touch function type corresponding to the sub-area and a movement track of the touch signal,
wherein there are a plurality of sub-areas in the display area of the floating window and a plurality of touch function types for the floating window, and different touch function types are corresponding to different sub-areas;
wherein the sub-area where the touch function type is a drag operation type is located in a first area of the floating window, in which the first area is located in top of the floating window and configured to display a title item, and
the sub-area where the touch function type is a closing operation type and the sub-area where the touch function type is a full-screen operation type, are located in middle of a second area of the floating window, and the sub-area where the touch function type is a zoom operation type is located in top of the second area of the floating window, in which the second area is located in bottom of the floating window and configured to display inputting tools.

12. The device of claim 11, wherein the processor is further configured to execute the instructions to:
when the touch function type corresponding to the sub-area is a drag operation type, acquire a display interface of the floating window,
calculate a direction vector of a current touch position and the initial touch position based on the movement track of the touch signal in real time,
determine an update display area of the floating window based on the direction vector, and
display the display interface in the update display area;
wherein a size of the update display area is the same as a size of an original display area of the floating window.

13. The device of claim 12, wherein the processor is further configured to execute the instructions to:
when the update display area of the floating window determined based on the direction vector exceeds a side edge of a display area of a touch screen, determine the update display area being located in the display area of the touch screen, and a distance between a corresponding same side edge of the update display area and the side edge of the display area of the touch screen being less than or equal to a preset distance.

14. The device of claim 12, wherein the processor is further configured to execute the instructions to:
after controlling the floating window to perform animation effect display, determine the update display area being located in the display area of the touch screen, and a distance between a corresponding same side edge of the update display area and the side edge of the display area of the touch screen being less than or equal to a preset distance.

15. The device of claim 12, wherein the processor is further configured to execute the instructions to:
display a first identifier on the display interface of the floating window, the first identifier being located on the sub-area where the touch function type is the drag operation type, and the first identifier being configured to prompt a user to perform a drag operation.

16. The device of claim 11, wherein the processor is further configured to execute the instructions to:
when the touch function type corresponding to the sub-area is a closing operation type, determine a movement direction of the touch signal, and
when the movement direction is a first direction, perform at least one of (a) closing the floating window, and (b) closing the floating window after a first rendering processing is performed on the floating window.

17. The device of claim 11, wherein the processor is further configured to execute the instructions to:
when the touch function type corresponding to the sub-area is a closing operation type, determine a movement direction of the touch signal,
when the movement direction is a first direction, perform and record a first rendering processing on the floating window during a maintaining process of the touch signal, and detect a sliding length of the touch signal,
close the floating window when the sliding length is greater than or equal to a preset length, and
perform the first rendering processing in reverse when the touch signal ends and the sliding length is less than the preset length.

18. The device of claim 11, wherein the processor is further configured to execute the instructions to:
when the touch function type corresponding to the sub-area is a full-screen operation type, determine a movement direction of the touch signal,
when the movement direction is a second direction, perform at least one of performing a second rendering processing on the floating window and displaying content of the floating window in a full-screen mode, and displaying content of the floating window in a full-screen mode after performing a second rendering processing on the floating window.

19. A non-transitory computer-readable storage medium having stored therein instructions that, when executed by a processor, causes the processor to perform:
receiving a touch signal in a display area of a floating window;
determining a sub-area located by an initial touch position of the touch signal; and
controlling the display of the floating window based on a touch function type corresponding to the sub-area and a movement track of the touch signal,
wherein there are a plurality of sub-areas in the display area of the floating window and a plurality of touch function types for the floating window, and different touch function types are corresponding to different sub-areas;
wherein the sub-area where the touch function type is a drag operation type is located in a first area of the floating window, in which the first area is located in top of the floating window and configured to display a title item, and
the sub-area where the touch function type is a closing operation type and the sub-area where the touch function type is a full-screen operation type, are located in middle of a second area of the floating window, and the sub-area where the touch function type is a zoom operation type is located in top of the second area of the floating window, in which the second area is located in bottom of the floating window and configured to display inputting tools.

* * * * *